Figure 1:
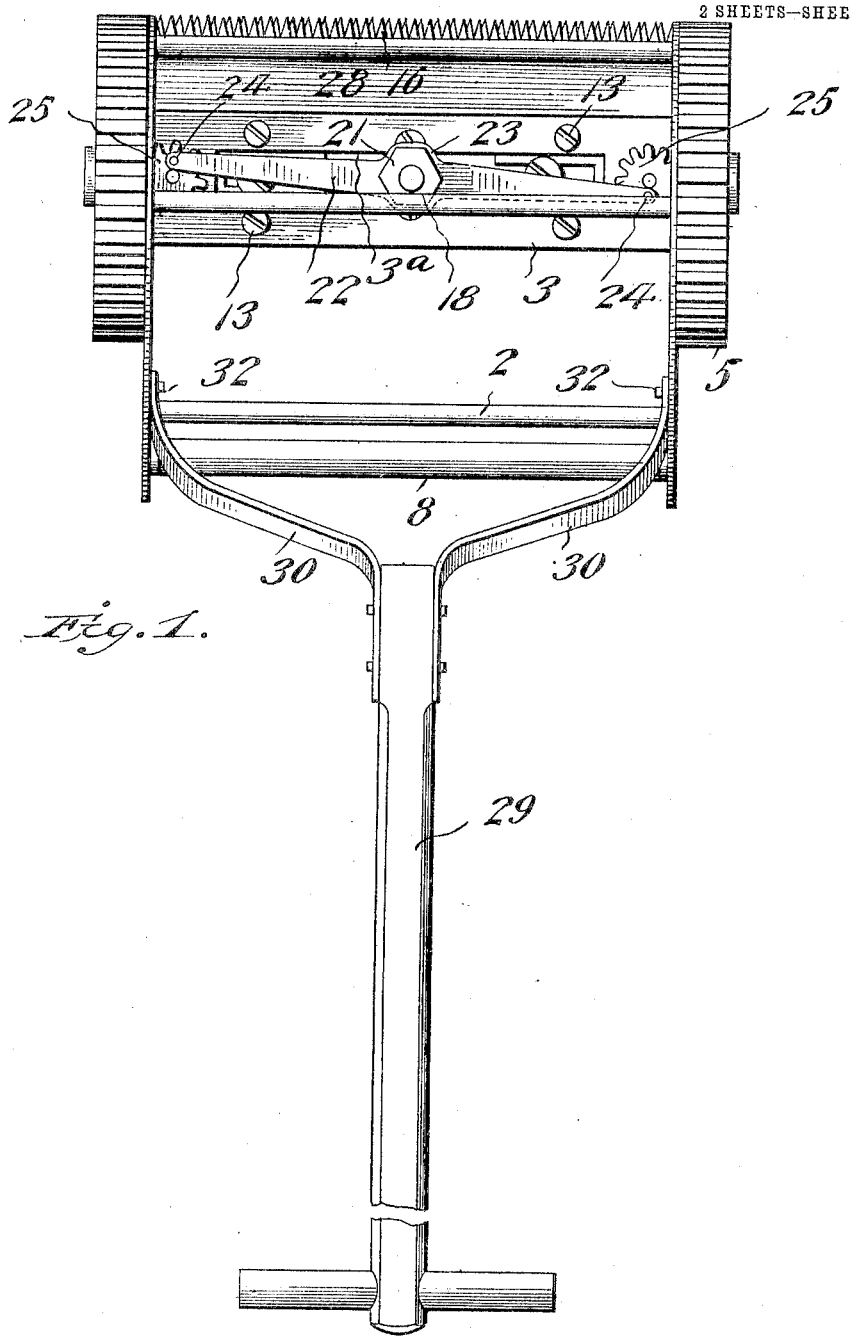

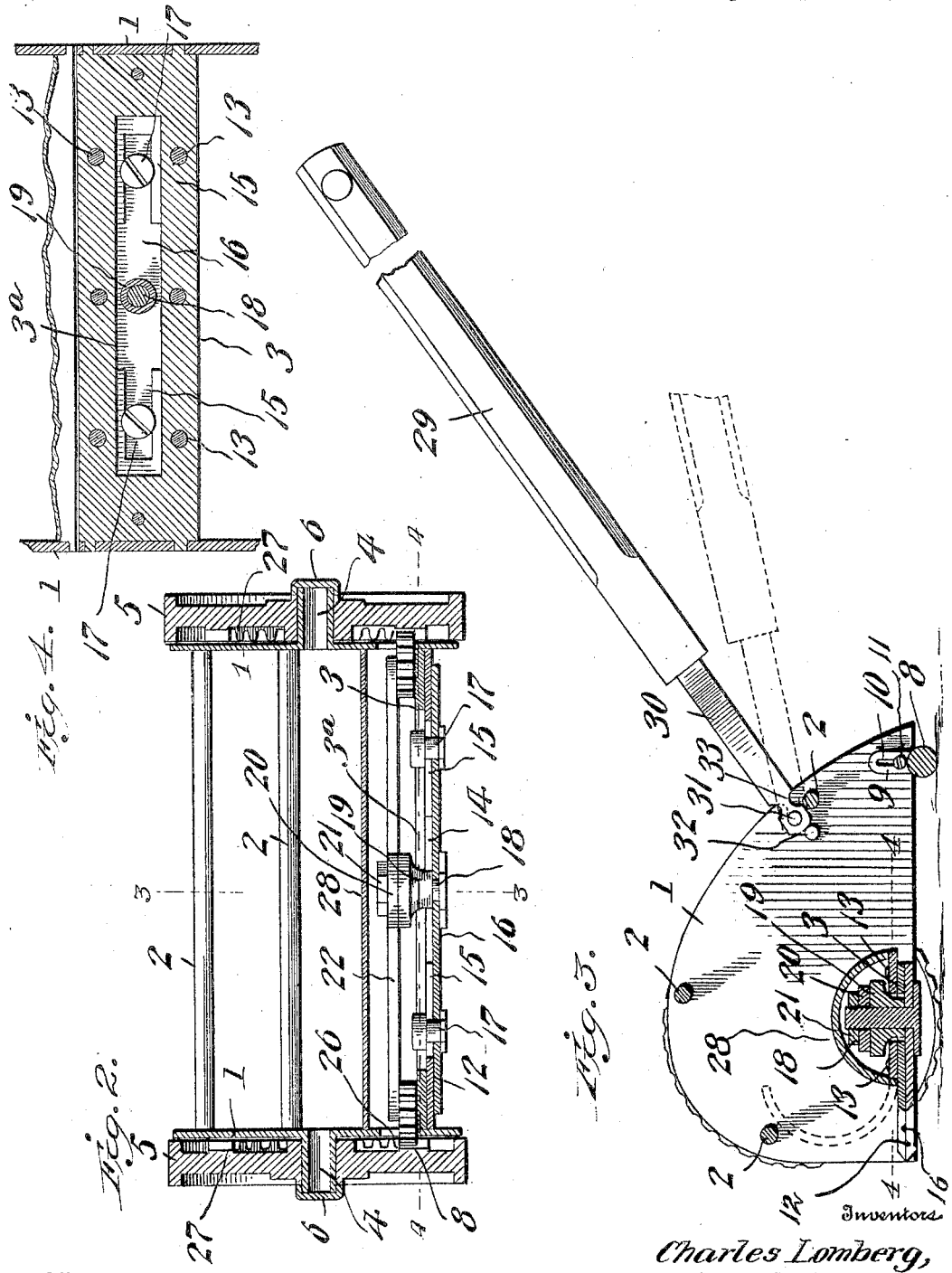

UNITED STATES PATENT OFFICE.

CHARLES LOMBERG AND WILLIAM L. STEPHENS, OF SHARONHILL, PENNSYLVANIA.

LAWN-MOWER.

No. 802,869.     Specification of Letters Patent.     Patented Oct. 24, 1905.

Application filed June 24, 1905. Serial No. 266,733.

*To all whom it may concern:*

Be it known that we, CHARLES LOMBERG and WILLIAM L. STEPHENS, citizens of the United States of America, residing at Sharonhill, in the county of Delaware and State of Pennsylvania, have invented new and useful Improvements in Lawn-Mowers, of which the following is a specification.

This invention relates to improvements in lawn-mowers, the object of the invention being to provide a light-running mower which is simple of construction, reliable and efficient in use, and adapted to cut grass of any length or height, and which embodies cutting mechanism comprising a stationary cutting-blade and a reciprocating cutting-blade sickle, together with mechanism for operating the sickle which is easy in action and readily accessible for repairs or the replacement of damaged or worn-out parts.

The preferred embodiment of the invention is illustrated in the accompanying drawings, in which—

Figure 1 is a top plan view of the improved lawn-mower, showing the pivoted casing open to expose the oscillating lever and connection for operating the sickle. Fig. 2 is a cross-section through the mower, taken on a line centrally through the axes of the supporting-wheels. Fig. 3 is a central longitudinal section taken on the line 3 3 of Fig. 2, and Fig. 4 is a horizontal section taken on the line 4 4 of Fig. 3.

In carrying our invention into practice we provide a supporting-frame comprising a pair of heads or disks 1 of suitable form and construction to serve the purpose, and which are connected and braced at proper points by cross bars or rods 2 and also by a transverse bottom or bed plate 3. The disks 1 are provided with outwardly-extending journals 4 for the usual supporting-wheels 5, which are held upon the journals by caps 6, secured to the outer ends of the journals by cotter-pins or keys 7. The bed-plate 3 and journals 4 are located a short distance in advance of the central vertical line of the frame and support the front portion thereof, the rear portion of the frame being supported by the usual transverse roller 8, said roller being journaled at its ends in bracket-plates 9, provided with slots 10, receiving screws or other suitable fastening devices 11, which adjustably secure the brackets to the disks or heads to permit the frame to be adjusted to regulate the cut.

Arranged upon the under side of the bed-plate 3 is a stationary cutter-plate 12, which is fixed to the bed-plate by screws or other suitable fastenings 13, and is provided with a comparatively wide central slot 14 and narrower guide-slots 15 on opposite sides of said central slot and opening thereinto at their inner ends. Arranged below the stationary cutter-plate 12 is a reciprocatory cutter plate or blade 16, which carries guide screws or bolts 17, projecting upward through the slots 15 and adapted to slide therein as the blade or sickle 16 reciprocates, the sickle being thereby guided in a true path. Fixed to the sickle is a pivot-bolt 18, having its head bearing against the under side of the sickle-blade and its shank projecting upwardly through the central slot 14 in the stationary cutter-blade 12 and carrying a collar or sleeve 19, widened at its upper end to project over upon the bed-plate 3, said sleeve being secured in position by fastening and check nuts 20 and 21, threaded upon the upper end of the bolt-shank. Fulcrumed centrally on the bolt is an oscillating lever 22, having an enlarged or widened central bearing portion 23, pierced for the passage of the bolt and resting upon the head or widened portion of the sleeve 19, which forms an effective support therefor. The lever is detachably secured upon the bolt by the nut 21 and is connected at its outer ends by the eccentric or wrist pins 24 to pinions 25, said pinions having portions of their peripheries projecting outwardly through slots 26 in the heads or disks 1 and meshing with gear-rims 27, formed or applied upon the inner sides of the supporting-wheels 5. The tread-surfaces of the supporting-wheels are preferably corrugated or serrated to obtain a firm hold on the ground-surface, and as the mower is propelled forwardly these wheels communicate motion through the gear-rims and pinions to the lever 22, which will be rocked or oscillated in a horizontal plane on the central pivot-bolt and at the same time reciprocated longitudinally of the bed-plate 3, the bolt and parts traveling during such motion in the slot 14 of the stationary cutter-plate and communicating slot 3$^a$ in the bed-plate and transmitting reciprocatory motion to the movable cutter plate or sickle 16. The crank-pins 24 are respectively disposed at diametrically opposite sides of the axes of the pinions 25, so as to operate in opposite directions in unison to oscillate and reciprocate the lever, the construction being such that the reciprocating sickle will be operated with a minimum of resistance, thus rendering the mower light-running. By the use of a stationary and reciprocating cutter-plate, arranged as herein shown and described, the mower is adapted to cut close to the ground-surface.

A semicircular cover or shield 28 is provided to inclose the lever, pinions, and coöperating parts of the actuating mechanism and to cover the slots in the respective plates to prevent the access of dirt, dust, grass, and other foreign substances thereto. This cover or shield has its front edge arranged to abut against the front edge of the bed-plate and is pivoted adjacent to said edge to the disks or heads 1, so that it may be closed down upon the bed-plate, as shown in full lines in Fig. 3, or thrown open in a forward direction to permit access to the working parts. When thrown forward or open, the cover rests against the forward cross-rod 2, by which it is supported in open position. A handle 29 is provided for manipulating the mower. This handle is connected to a yoke formed of straps 30, pivotally connected at their free ends by pivot-pins 31 to the disks 1 adjacent to the rear cross bar or rod 2. On one of the disks 1 a stop-pin 32 is provided, against which the pivoted end of the adjacent strap is adapted to bear to limit the upward and forward movement of the handle. The straps 30 are provided in their lower edges with notches 33 to engage the rear cross-bar 2 to limit the downward or lowered position of the handle.

From the foregoing description, taken in connection with the accompanying drawings, the construction, mode of operation, and advantages of the invention will, it is thought, be readily understood without a further extended description.

Having thus described the invention, what is claimed as new is—

1. In a lawn-mower, the combination of a supporting-frame, ground-wheels mounted thereon, a stationary cutter-plate on the frame, a reciprocatory cutter-plate coacting therewith, an intermediately-fulcrumed oscillating and reciprocatory lever for operating said reciprocatory cutter-plate, and means coöperating between the ground-wheels and ends of the lever for operating said lever from the ground-wheels.

2. In a lawn-mower, the combination of a supporting-frame, ground-wheels mounted thereon and provided with gear members, a stationary cutter-plate on the frame, a reciprocatory cutter-plate coacting therewith, a lever intermediately fulcrumed to said reciprocatory cutter-plate, pinions on the frame operated by the gear members on the wheels, and wrist or eccentric pins connecting said pinions with the ends of the lever.

3. In a lawn-mower, the combination of a supporting-frame, ground-wheels mounted thereon and provided with gear members, a stationary cutter-plate fixed to the bed-plate of the frame and formed with guide-slots, a reciprocatory cutter-blade provided with guide members slidable in said slots, a pivot-bolt carried by the reciprocatory blade, a lever fulcrumed intermediately to said bolt, and pinions provided with crank-pins connected with the ends of the lever, said pinions meshing with the gear members on the ground-wheel.

4. In a lawn-mower, the combination of a supporting-frame provided with a slotted bed-plate, a stationary cutter-plate carried by the bed-plate, a reciprocatory cutter-plate coacting with said stationary cutter-plate, a pivot-bolt projecting through the slot in the bed-plate and connected to the reciprocatory cutter-plate, an oscillating and reciprocating lever intermediately pivoted to said bolt, ground-wheels mounted upon the frame, operating connections between said wheels and the ends of the lever, and a semicircular shield pivotally mounted to close down over the bed-plate, lever and operating connections and to be swung open to expose the same, substantially as described.

In testimony whereof we affix our signatures in presence of two witnesses.

CHAS. LOMBERG.
WM. L. STEPHENS.

Witnesses:
SARA G. SWOPE,
JOS. P. SWOPE.